Patented Dec. 27, 1927.

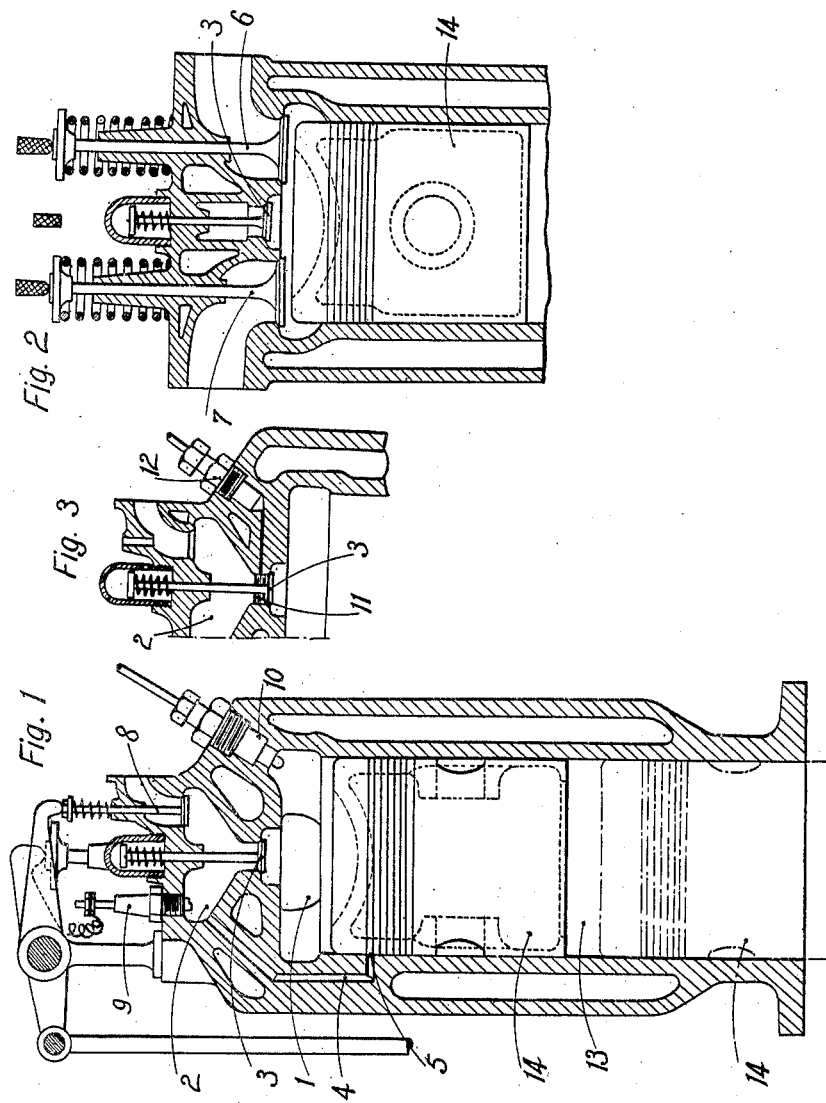

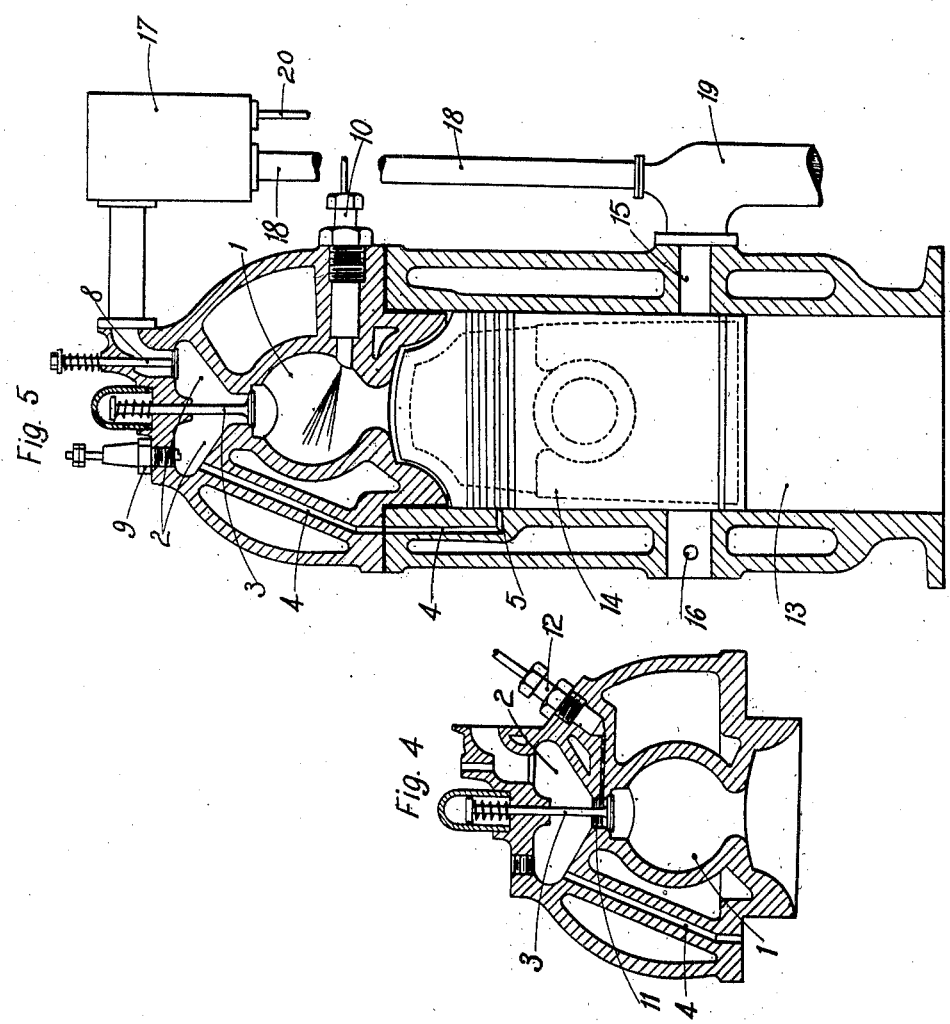

1,653,825

UNITED STATES PATENT OFFICE.

LÉON SAIVES, OF BILLANCOURT, FRANCE, ASSIGNOR TO LOUIS RENAULT, OF BILLANCOURT, FRANCE.

INTERNAL-COMBUSTION ENGINE.

Application filed August 24, 1925, Serial No. 51,955, and in France October 18, 1924.

The invention relates to improvements in internal combustion engines of both the two stroke cycle and four stroke cycle type in which a heavy liquid fuel is vaporized, sprayed and ignited by a previously ignited mixture containing a light fuel.

The slightly volatile or heavy liquid fuel is injected either during the compression period, or at the upper dead point, at the moment of maximum compression, as is done in the case of Diesel or semi-Diesel engines, but the ignition of the charge of fuel is helped by the explosion of a mixture of more volatile or lighter fuel in an auxiliary chamber separate from the main chamber, and communicating with it only at the moment of the explosion of the auxiliary mixture.

One of the features of the invention is the fact that the compression in the auxiliary chamber is limited to that which is compatible with efficient ignition of the mixture of volatile fuel, whilst in the main chamber, which is supplied with the heavy fuel, the compression may be carried to a high degree as in the well known Diesel engines, making it possible to burn heavy fuels of all kinds in the cylinder. The degree of compression in the main chamber must however be less than the pressure produced by the explosion of the mixture in the auxiliary chamber. An apparatus has further been provided which makes the starting-up of such an engine as easy as that of an engine on a self-propelled vehicle by lowering the degree of compression in the main chamber during the starting-up period. It will thus be easier to ensure starting, running unloaded and even on light loads by means of the volatile light fuel alone.

The heavy fuel may be injected onto the main chamber, or alternatively introduced above the communication valve between the two chambers so as to be injected into the main chamber at the moment of explosion.

In the accompanying drawings Figs. 1, 2 and 3 show a construction for carrying out the invention in a four-stroke cycle engine, whilst Figs. 4 and 5 show a construction in the case of a two-stroke cycle engine.

Referring to Figs. 1 and 2 it will be seen that the engine comprises a combustion chamber at high compression. An ignition chamber 2 at low compression communicates on the one hand with the chamber 1 by an automatic valve 3 opening from the chamber 2 to the chamber 1 and on the other hand with the working cylinder by a passage 4 opening into the cylinder at 5.

In the chamber 1 are located as usual the pure air suction valve 6 and the exhaust valve 7.

In the chamber 2 are located the suction valve 8 for the readily inflammable mixture, said valve being either controlled or automatic, as well as the sparking plug 9 or other ignition device.

The heavy fuel is introduced either into the chamber 1, Fig. 1, by the injector 10 in the form of spray during the period of compression, or at the upper dead-point according to the regulation, or alternatively into the ignition chamber 2, Fig. 3, at 10 through a nozzle 12 and a passage above the automatic valve 3.

The injector 10 is connected to an ordinary volumetric pump forcing in the heavy fuel at the desired moment.

The nozzle 12 may also be connected to a volumetric pump bringing the fuel to 11 or again it may be connected to a container, the fuel being supplied at 11 automatically owing to the decrease of pressure caused in the chamber 2 by the down stroke of the working piston. In this latter case the admission of the heavy fuel at 11 takes place at the same time as the suction of the mixture of lighter fuel into the chamber 2.

The point 5 of air intake into the cylinder 13 is chosen in such manner as to introduce into the chamber 2 through the passage 4 pure air compressed to a low pressure allowing of the ignition of the mixture of lighter fuel.

In the case where the injector 10 is employed, the engine works in the following way:—The valve 3 normally rests on its seat and the two chambers 1 and 2 are in communication only through the passage 4.

At the first stroke of the cycle on the down-stroke of the piston 14 there is induced a suction of the inflammable mixture into the chamber 2 through the valve 8, as well as a suction of atmospheric air into the chamber 1 and into the cylinder through the valve 6. At the bottom dead point the chamber 2 is filled with inflammable mixture and the cylinder 13 with pure air.

At the second stroke of the cycle the piston 14 moves upwards, which corresponds to the compression period in the chambers 1 and 2. The chamber 2 is cut off at the point 5 from the ignition chamber, whence there results a reduced compression required for the inflammable mixture contained therein. The piston 14 continuing its up stroke compresses the air to a high degree in the chamber 1 only. During the up stroke of the piston the heavy fuel is introduced by the injector 10 at the moment desired for obtaining a good spraying.

At the third stroke of the cycle and a little before the upper dead point is reached the ignition device 9 comes into operation, ignites the charge contained in the chamber 2, causing an increase of pressure higher than the compression of the mixture of air and heavy fuel in the chamber 1. The valve 3 opens, the gases produced by the the explosion of the mixture in the chamber 2 pass into the chamber 1 and ignite the mixture of heavy fuel and air which then burns. Expansion occurs and the beginning of the exhaust takes place towards the bottom dead point.

At the fourth stroke of the cycle under the action of the piston which moves up again the gases produced by the combustion are expelled.

Fig. 3 shows a construction in which the operation is identical with the above, save that the heavy fuel is introduced in an unatomized state the nozzle 12 and passage above the valve 3.

The explosion of the charge in the chamber 2 opens the valve 3 and forces the heavy fuel into the chamber 1 at the same time vaporizing it and assisting its ignition.

The starting up of such an engine may be effected by an auxiliary engine, by compressed air or other suitable means. It can also be done by hand like the engines of self-propelled vehicles.

In order to start by hand which can be done easily with the reduced compressions, it is necessary to maintain in the chamber 1 a pressure equal to that limited in the chamber 2 by the closing of the passage 4 by the piston 14 at the point 5.

A device consisting of a decompression cam acting upon the exhaust valve permits the maintenance in the chamber 1 of the same pressure as that obtaining in the chamber 2, when the piston reaches the point 5. This device is similar to that employed in explosion engines to aid starting up.

For starting up the engine is not supplied with heavy fuel, but it starts on the light inflammable mixture. Once started the distribution becomes normal, and the above described device for decompression is suppressed, high compression is obtained in the chamber 1 and the heavy fuel may be supplied at 10 or at 11.

It is obvious that the engine may be supplied with the explosive mixture in 2 when running unloaded and even on light loads.

When the engine is sufficiently warmed up the operation of the ignition chamber 2 may be stopped, the engine then working like an engine with ordinary injection, the ignition of the heavy fuel being obtained at this moment by the temperature of the high compression in the chamber 1.

As the valve 3 cuts off communication between the chambers 1 and 2, this latter is completely isolated, and the sparking plug 9 and the valve 8 are protected from the high temperatures of combustion in the chamber 1. In the case where the engine works on heavy fuel alone it will be possible after starting up to isolate the two chambers more completely by operating a stop valve located in the passage 4, not shown in the drawing.

Referring to Figs. 4 and 5 showing the application of the improved method to a two-stroke cycle engine, it is seen that the valves 6 and 7 are omitted, their functions being replaced by the scavenging and exhaust openings 15 and 16.

The working in the chamber 2 is the same as in the case of a four-stroke cycle engine, the difference of compressions in the chambers 1 and 2 being obtained in the same manner as well as the supplies of light and heavy fuels.

The pressure in the cylinder being always higher than the atmospheric pressure, the valve 8 cannot open automatically. If this valve were controlled it would be necessary to introduce the gas coming from the carburetor under pressure. In order to facilitate such introduction it will suffice to place the carburetor supplying the light fuel under the pressure of the scavenging air. The carburetor is placed in an impervious box 17, connected by a pipe 18 with the scavenging conduit 19, the admission of petrol is through the pipe 20, coming from a container placed under sufficient load, or subjected to a pressure higher than that of the scavenging air by any suitable means.

The starting up will place in the same way as in four-stroke cycle engines, a controlled discharge valve being provided on the chamber 1 to limit momentarily the pressure in the chamber 1 to that in the chamber 2.

It is to be understood that the communication valve between the auxiliary chamber and the combustion chamber, which is shown as an automatic valve, might equally well be controlled.

Claims:

1. In an internal combustion engine having a main combustion chamber, an auxiliary combustion chamber, a communicating valve between the auxiliary and the main combustion chamber, fuel admission means for the auxiliary combustion chamber, and piston controlled means for admitting air to the auxiliary combustion chamber from the cylinder at a lower pressure than the normal compression pressure.

2. In an internal combustion engine having a main combustion chamber, an auxiliary combustion chamber, a communicating valve between the auxiliary and the main combustion chamber, fuel admission means for the auxiliary combustion chamber, and an air duct leading from the main chamber to the auxiliary chamber, the point of admission of air from the main chamber being at a predetermined distance below the end of the piston when at upper dead center.

3. In an internal combustion engine having a main combustion chamber, an auxiliary combustion chamber, a communicating valve between the auxiliary and the main combustion chamber, means for admitting high volatile fuel to the auxiliary combustion chamber, means for admitting low volatile fuel to the auxiliary combustion chamber, and piston controlled means for admitting air from the cylinder to the auxiliary combustion chamber at a lower pressure than the normal compression pressure.

4. In an internal combustion engine having a main combustion chamber, an auxiliary combustion chamber, a communicating valve between the auxiliary and the main combustion chamber, said auxiliary combustion chamber being shaped to form a fuel receptacle in conjunction with said valve, means for admitting high volatile fuel to the auxiliary combustion chamber, means for admitting low volatile fuel to the receptacle, and piston controlled means for admitting air from the cylinder to the auxiliary combustion chamber at a lower pressure than the normal compression pressure.

In testimony whereof I affix my signature.

LÉON SAIVES.